(12) United States Patent
Yoshida et al.

(10) Patent No.: US 7,501,466 B2
(45) Date of Patent: Mar. 10, 2009

(54) ACRYLIC ELASTOMER COMPOSITION

(75) Inventors: Tamotsu Yoshida, Kitaibaraki (JP); Jun Okabe, Kitaibaraki (JP)

(73) Assignee: Nippon Mextron, Limited, Tokyo (JP)

( * ) Notice: Subject to any disclaimer, the term of this patent is extended or adjusted under 35 U.S.C. 154(b) by 0 days.

(21) Appl. No.: 11/643,391

(22) Filed: Dec. 21, 2006

(65) Prior Publication Data

US 2007/0179228 A1 Aug. 2, 2007

Related U.S. Application Data

(60) Division of application No. 10/693,686, filed on Oct. 24, 2003, now abandoned, which is a continuation of application No. 09/277,590, filed on Mar. 26, 1999, now abandoned.

(30) Foreign Application Priority Data

May 14, 1998 (JP) .............................. 1998-150745

(51) Int. Cl.
*C08K 5/00* (2006.01)
*C08K 3/10* (2006.01)

(52) U.S. Cl. ..................... 524/284; 524/448; 525/326.3

(58) Field of Classification Search ................. 524/284, 524/448; 525/326.3
See application file for complete search history.

(56) References Cited

U.S. PATENT DOCUMENTS

| 3,919,143 A | 11/1975 | Morris |
| 4,931,509 A | 6/1990 | Yagishita et al. |

FOREIGN PATENT DOCUMENTS

| EP | 0 811 659 A | 12/1997 |
| JP | 50-132057 A | 10/1975 |
| JP | 63-189451 | 8/1988 |
| JP | 07-228746 | 8/1995 |
| JP | 07278426 | 10/1995 |
| JP | 08-157679 A | 6/1996 |

*Primary Examiner*—Kriellion A Sanders
(74) *Attorney, Agent, or Firm*—Butzel Long

(57) ABSTRACT

An acrylic elastomer composition comprising (A) a halogen-containing acrylic elastomer, (B) a polyvalent carboxylic acid, (C) a quaternary onium salt and (D) a hydrotalcite can be vulcanized within a shorter vulcanization time to give a vulcanization product having distinguished normal state physical properties and compression set characteristics, even without any secondary vulcanization.

6 Claims, No Drawings

ACRYLIC ELASTOMER COMPOSITION

RELATED APPLICATION

This application is a divisional application of U.S. patent application Ser. No. 10/693,686, filed Oct. 24, 2003 now abandoned which is a continuation of U.S. patent application Ser. No. 09/277,590, filed Mar. 26, 1999 now abandoned, to which priority is claimed under 35 U.S.C. §120 and to which priority is claimed under 35 U.S.C. §119 to JP 1998-150745, filed May 14, 1998.

BACKGROUND OF THE INVENTION

1. Field of the Invention

The present invention relates to an acrylic elastomer composition and more particularly to an acrylic elastomer composition having distinguished vulcanization characteristics and scorch stability.

2. Description of Related Art

JP-A-50-132057 discloses a vulcanizable composition comprising a halogen-containing acrylic elastomer, a polyfunctional carboxylic acid, a quaternary ammonium salt and a halide ion acceptor, where it is stated that the halide ion acceptor includes well known metal oxy compounds as acid acceptors, such as alkali metal salts or non-alkali metal salts of monocarboxylic acid or organophosphoric acid; oxides, hydroxides or carbonates of non-alkali metals, metal; salts of inorganic acids; molecular sieves, etc.

The polyfunctional carboxylic acid includes, so far as its Examples are concerned, disodium azelate, dipotassium azelate, disodium sebacate, disodium trimethyladipate, bis(benzyltrimethylammonium) trimethyladipate, dipotassium dodecenylsuccinate, disodium or dipotassium of high molecular weight fatty acid dimer, etc., all of which are used in the form of disalt.

However, in case of using disodium azelate, both of the resulting primary vulcanization product and the secondary vulcanization product have considerably poor compression set characteristics, as shown in the results of Comparative Example 6 mentioned below in contrast to Example 4 using azelaic acid, and furthermore much prolonged vulcanization time is required with poor vulcanization characteristics. More particularly, secondary vulcanization is indispensable due to the relatively low crosslinking speed.

SUMMARY OF THE INVENTION

An object of the present invention is to provide a halogen-containing acrylic elastomer composition, which can be vulcanized within a much shorter vulcanization time and can give vulcanization products having distinguished normal state physical properties and compression set characteristics even without any secondary vulcanization.

The object of the present invention can be attained by an acrylic elastomer composition, which comprises (A) a halogen-containing acrylic elastomer, (B) a polyvalent carboxylic acid, (C) a quaternary onium salt and (D) a hydrotalcite.

DETAILED DESCRIPTION OF THE INVENTION

The halogen-containing acrylic elastomer for use as Component (A) is copolymers of at least one of alkyl acrylate, alkoxyalkyl acrylate, alkylthioalkyl acrylate, cyanoalkyl acrylate, etc. as the main component (about 60 to 99.8% by weight), copolymerized with about 0.1 to about 10% by weight, preferably about 1 to about 5% by weight of (1) 2-chloroethyl vinyl ether, 2-chloroethyl acrylate or vinylbenzyl chloride, (2) vinyl chloroacetate or allyl chloroacetate, (3) an addition reaction product of a glycidyl compound such as glycidyl acrylate, glycidyl methacrylate, allyl glycidyl ether, etc. and monochloroacetic acid, or (4) a crosslinking site halogen-containing monomer such as alkenyl ester of α- or β-halogen-substituted aliphatic monocarboxylic acid, haloalkyl ester of (meth)acrylic acid, haloalkyl alkenyl ester, haloalkyl alkenyl ketone, or haloacetoxyalkyl ester, haloacetyl group-containing unsaturated compound, etc. The copolymers can be further copolymerized with not more than about 30% by weight of other ordinary vinyl compound. Furthermore, acrylic copolymers copolymerized with lactone-modified acrylate (JP-A-63-264612) or terminal cyanolactone-modified acrylate (JP-A-1-123809), or the like can be used.

Furthermore, the halogen-containing acrylic elastomer includes halogen and carboxyl group-containing acrylic elastomers, for example, the above-mentioned halogen-containing acrylic elastomers copolymerized with about 0.1 to about 10% by weight, preferably about 1 to about 5% by weight, of an unsaturated monocarboxylic acid such as acrylic acid, methacrylic acid, maleic acid, etc. or an unsaturated dicarboxylate monoester such as mono-lower alkyl maleate, etc.

The polyvalent carboxylic acid for use as Component (B) includes aliphatic polyvalent acids having 4 to 30 carbon atoms, alicyclic polyvalent acids or aromatic polyvalent carboxylic acids. Aliphatic dicarboxylic acids are preferable. Polyvalent carboxylic acids can be used as acid anhydrides.

More particularly, the dicarboxylic acid includes saturated aliphatic dicarboxylic acids such as succinic acid, glutaric acid, adipic acid, pimelic acid, suberic acid, azelaic acid, sebacic acid, undecanedion acid, 1,10-decane-dicarboxylic acid, 1,11-undecanedicarboxylic acid, 1,12-dodecanedicarboxylic acid, 1,14-tetradecanedicarboxylic acid, hexadecanedion acid, β,β-dimethylsuccinic acid, β,β-dimethylglutaric acid, β-ethylglutaric acid, α-ethyladipic acid, trimethyladipic acid, n-hexylsuccinic acid, n-octylsuccinic acid, n-decylsuccinic acid, n-decenylsuccinic acid, n-tetradecylsuccinic acid, n-octadecylsucinic acid, isooctadecenylsuccinic acid, n-eicosenylsuccinic acid, n-dodecenylsuccinic acid, etc.; unsaturated aliphatic dicarboxylic acids such as maleic acid, fumaric acid, etc.; alicyclic dicarboxylic acids such as 1,2-cyclohexanedicarboxylic acid, 1,3-cyclohexanedicarboxylic acid, 1,4-cyclohexanedicarboxylic acid, phthalic acid etc.; and aromatic dicarboxylic acids such as isophthalic acid, terephthalic acid, etc.

About 0.1 to about 10 parts by weight, preferably about 0.1 to about 5 parts by weight, of the polyvalent carboxylic acid is used on the basis of 100 parts by weight of the halogen-containing acrylic elastomer. Below about 0.1 part by weight, physical characteristics of the vulcanization products will be considerably deteriorated due to unsatisfactory crosslinking, whereas above about 10 parts by weight physical characteristics of the vulcanization products will be also considerably deteriorated due to the destroying of crosslinking sites of the elastomer by a crosslinking agent in excess.

Quaternary onium salt as component (C) can be represented by the following general formula, and quaternary phosphonium salts can be preferably used:

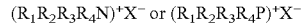

where $R_1$ to $R_4$ are each an altyl group having 1 to 25 carbon atoms, an alkoxy group, an aryl group, an alkylaryl group, an aralkyl group or a polyoxyalkylene group, or two or three of which may form a heterocyclic structure together with N or P;

and X⁻ is an anion such as Cl⁻, Br⁻, I⁻, $HSO_4^-$, $H_2PO_4^-$, $RCOO^-$, $ROSO_2^-$, $RSO^-$, $ROPO2H^-$, $CO_3^-$, etc.

Specifically, it includes quaternary ammonium salts such as tetra-butylammonium bromide, tetrabutylammonium chloride, tetrabutyl-ammonium iodide, tetraethylammonium bromide, tetraethylammonium chloride, tetraethylammonium iodide, n-dodecyltrimethylammonium bromide, octadecyltrimethylammonium bromide, trimethylbenzyl-ammonium bromide, cetyldimethylbenzylammonium chloride, cetyl-pyridinium bromide, cetyl-pyridinium sulfate, tetra-ethylammonium acetate, trimethylbenzylammonium benzoate, trimethylbenzylammonium borate, 5-benzyl-1,5-diaza-bicyclo-[4,3,0]-5-nonenium chloride, 5-benzyl-1,5-diazabicyclo[4,3,0]-5-nonenium tetrafluoroborate, etc.; quaternary phosphonium salts such as tetraphenyl-phosphonium chloride, benzyl-triphenylphosphonium bromide, benzyl-triphenylphosphonium chloride, triphenylmethoxymethylphosphonium chloride, triphenyhnethylcarbonylmethylphosphonium chloride, triphenyl-ethoxycarbonylmethylphosphonium chloride, trioctylbenzylphosphonium chloride, trioctylmethylphosphonium chloride, trioctylethylphosphonium acetate, tetraoctylphosphonium chloride, trioctylethylphosphonium dimethyl-phosphate, etc.

About 0.1 to about 10 parts by weight, preferably about 0.1 to about 5 parts by weight, of the quaternary onium salt is used on the basis of 100 parts by weight of the halogen-containing acrylic elastomer. Below about 0.5 parts by weight the progress of vulcanization will be considerably retarded, whereas above about 10 parts by weight the vulcanization rate is too much accelerated, resulting in deterioration of scorch stability.

The hydrotalcite for use as Component (D) can be represented by the following general formula:

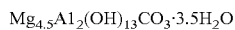

$Mg_{4.5}Al_2(OH)_{13}CO_3 \cdot 3.5H_2O$ and any one of synthetic hydrotalcites subjected to surface treatment or not, removal of water of crystallization, firing, etc. and those of natural origin such as products of Russion Ural district, Norwegian Snarm district, etc. can be used. Practically, commercially available products such as DHT-4A, DHT-4A-2, KW-2000, etc. (all of which are trademarks of products made by Kyowa Kagaku KK, Japan) can be used directly.

These hydrotalcites are inorganic anion exchangers, where $CO_3$ parts within the structure are substituted with halogen ions, etc. to inactivate halogen. For example, in case of chlorine ions, the reaction proceeds as follows:

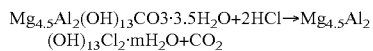

$Mg_{4.5}Al_2(OH)_{13}CO3 \cdot 3.5H_2O + 2HCl \rightarrow Mg_{4.5}Al_2(OH)_{13}Cl_2 \cdot mH_2O + CO_2$ the trapped chlorine is not released till about 450° C. or higher and thus can be normally kept completely inactive. Metal oxides of ordinary use, for example, MgO, are formed into $MgCl_2$ upon trapping of hydrochloric acid, resulting in deterioration of water resistance and metal corrosion, whereas the hydrotalcite can prevent occurrence of such troubles. About 0.5 to about 20 parts by weight, preferably about 1 to about 10 parts by weight, of the hydrotalcite having such effects is used on the basis of 100 parts by weight of the halogen-containing acrylic elastomer. Below about 0.5 parts by weight vulcanization hardly proceeds, whereas above about 20 parts by weight the vulcanization rate is too much accelerated, resulting in deterioration of scorch stability.

Besides the foregoing essential components, such additives as a filler, a lubricant, a vulcanization retardant, a plasticizer, an antioxidant, etc. can be used upon proper blending. Higher fatty acids such as stearic acid, etc. are usually used as a lubricant, but higher fatty acids inhibit crosslinking in the present composition. Thus, polyhydric alcohol esters of higher fatty acids or higher aliphatic amines are used as a lubricant in an amount of about 0.1 to about 10 parts by weight, preferably about 0.1 to about 5 parts by weight, on the basis of 100 parts by weight of the halogen-containing acrylic elastomer.

Polyhydric alcohol esters of higher fatty acids for use in the present invention include esters of higher fatty acids having 6 to 30 carbon atoms such as oleic acid, lauric acid, myristic acid, palmitic acid, stearic acid, behenic acid, etc. and polyhydric alcohols such as glycol, glycerine, pentaerythritol, etc. The esters can be monoesters, diesters, triesters, tetraesters or mixtures thereof.

The higher aliphatic amines for use in the present invention include tertiary amines or secondary amines containing at least one higher aliphatic group having 1 to 24 carbon atoms, for example, tertiary amines such as dimethyloctyl-amine, dimethyldecylamine, dimethyllaurylamine, dimethyl-myristylamine, dimethylpalmitylamine, dimethylstearylamine, dimethyl-oleylamine, dilaurylmonomethylamine, trioctylamine, etc. and secondary amines such as dioctylamine, didecylamine, dilaurylamine, dimyristylamine, dipalmitylamine, distearylamine, etc.

When about 0.1 to about 10 parts by weight, preferably about 0.1 to about 5 parts by weight, of ureas are further used as a vulcanization retardant on the basis of 100 parts by weight of the halogen-containing acrylic elastomer, much better scorch stability can be obtained.

The ureas for this purpose include, besides urea and thiourea, their substitution compounds such as N-methyl, N-ethyl, N,N-dimethyl, N,N'-diethyl, N,N-diethyl, N,N'-ethylidene, N-acetyl, N-methyl-N'-acetyl, N,N'-dimethylol, tetramethyl, carbamyl, N-phenyl, N-benzyl, N-ethyl-N'-phenyl, N,N'-diphenyl, N,N-diphenyl, N-benzoyl, tetraphenyl or N,N-dimethyl-N,N'-dichlorophenyl-substituted compounds, and further include carbamoylcarbamidic acid, ethyleneurea, glycolylurea, dimethylparabanic acid, benzimidazolone, 5-methyluracil, etc.

The composition can be prepared by a tightly closed mixer such as a kneader, Banbury mixer, etc., or by an open mixer such as an open roll, etc., and vulcanized by press vulcanization or vulcanization molding using an injection molding machine at a temperature of about 150° to about 250° C. for about 1 to about 30 minutes. If necessary, oven vulcanization or steam vulcanization can be further carried out at a temperature of about 150° to about 200° C. for about 1 to about 22 hours as secondary vulcanization.

In the prior art disclosed in the above-mentioned JP-A-50-132057 practically using only polyvalent carboxylic acid salt in spite of the statement of applicability of polyvalent carboxylic acids, an acrylic elastomer composition capable of giving distinguished vulcanization characteristics can be obtained in the present invention by using polyvalent carboxylic acids per se. Vulcanization products of the present acrylic elastomer composition have also distinguished compression set characteristics.

By using a hydrotalcite in place of the halogen ion acceptor used in the above-mentioned JP-A-50-132057, not only an acrylic elastomer composition having a particularly distinguished vulcanization rate can be obtained in the present invention, but also vulcanization products of the present acrylic elastomer composition have also distinguished heat resistant property and compression set characteristics.

Furthermore, vulcanization products having good normal state physical properties and compression set characteristics can be obtained in the present invention without any secondary vulcanization. That is, the vulcanization time can be largely shortened. On the other hand, as is obvious from comparison of Example 4 (use of azelaic acid) with Comparative Example 6 (use of disodium azelate), compression set characteristics of Comparative Example 6 are poor and thus the secondary vulcanization is substantially indispensable. Furthermore, as is obvious from comparison of Example 4 with Comparative Examples 1 to 5, the vulcanization rate is more distinguished in the present invention, even if the same azelaic acid is used in these cases, and there is a remarkable difference particularly in the compression set characteristics there between.

The present acrylic elastomer composition having these distinguished characteristics can be effectively used as molding materials for oil seals, O-rings, packings, gaskets, hoses, etc.

PREFERRED EMBODIMENTS OF THE INVENTION

The present invention will be described in detail below, referring to Examples and Comparative Examples, where parts are by weight.

EXAMPLE 1

100 parts of acrylic elastomer A consisting of an ethyl acrylate-p-chloromethylstyrene copolymer (ratio by weight=98:2) was admixed with the following components, kneaded by an open roll and subjected to press vulcanization at 180° C. for 8 minutes and then to oven vulcanization (postcure) at 175° C. for 4 hours:

| | |
|---|---|
| Pentaerythritol fatty add ester (Emaster 430W, trademark of a product made by Riken Vitamine K.K., Japan) | 2 parts |
| Dimethylstearylamine (Farmine DM80, trademark of a product made by Kao Corp., Japan) | 1 part |
| 4,4'-bis(a,a-dimethylbenzyl)diphenylamine (Nocrac CD, trademark of a product made by Ouchi-Shinko Kagaku KK, Japan) | 2 parts |
| FEF carbon black (N550) | 50 parts |
| Adipic acid | 0.8 parts |
| Octadecyltrimethylammonium bromide | 1 part |
| Synthetic hydrotalcite (DHT-4A-2, trademark of a product made by Kyowa Kagaku K.K., Japan) | 4 parts |

The resulting kneading product and vulcanization product were subjected to determination of the following characteristics:

Vulcanization characteristics: tc10, tc90 and MH at 180° C. by a curastometer

Mooney viscosity and scorch time($t_5$): 125° C. according to JIS K-6300

Vulcanization characteristics: according to JIS K-6301

Compression set: 150° C. for 70 hours according to JIS K-6301

Heat aging resistant property: changes in the normal state physical properties by heating at 175° C. after 70 hours

EXAMPLE 2

In Example 1, the same amount of acrylic elastomer B consisting of an ethyl acrylate-n-butyl acrylate-2-methoxyethyl acrylate-vinyl chloroacetate quaternary copolymer (ratio by weight=48:25:25:2) was used in place of the acrylic elastomer A, and the amount of FEF carbon black was changed to 60 parts.

EXAMPLE 3

In Example 1, the same amount of an acrylic elastomer C consisting of an ethyl acrylate-n-butyl acrylate-2-methoxyethyl acrylate-p-chloromethyl-styrene quaternary polymer (ratio by weight=48:25:25:2) was used in place of the acrylic elastomer A, and the amount of FEF carbon black was changed to 60 parts.

EXAMPLE 4

In Example 3, one part of azelaic acid was used in place of 0.8 parts of adipic acid.

EXAMPLE 5

In Example 3, 1.1 part of sebacic acid was used in place of 0.8 parts of adipic acid.

EXAMPLE 6

In Example 3, the same amount of benzyltriphenylphosphonium chloride was used in place of the octadecyltrimethylammonium bromide.

EXAMPLE 7

In Example 3, 0.5 parts of diphenylurea was further added.

EXAMPLE 8

In Example 3, 0.6 parts of succinic anhydride was used in place of the adipic acid.

Results of determination in the foregoing Examples 1 to 8 are shown in the following Table 1.

TABLE 1

| | Example No. | | | | | | | |
|---|---|---|---|---|---|---|---|---|
| Item | 1 | 2 | 3 | 4 | 5 | 6 | 7 | 8 |
| [Vulcanization Characteristics] | | | | | | | | |
| tc10 (min.) | 0.4 | 0.42 | 0.4 | 0.4 | 0.4 | 0.6 | 0.6 | 0.7 |
| tc90 (min.) | 3.9 | 2 | 3.7 | 3.9 | 3.8 | 4.2 | 4.3 | 4.4 |
| MH (Kg · cm) | 8.2 | 9.8 | 9 | 9 | 9.1 | 8.9 | 8.8 | 8.2 |
| [Mooney viscosity] | | | | | | | | |
| Mooney viscosity $ML_{MIN}$ | 46 | 53 | 50 | 51 | 51 | 50 | 47 | 47 |
| [Scorch time] | | | | | | | | |
| $t_5$ (min.) | 5.8 | 5 | 6.6 | 6.3 | 6.2 | 7.2 | 8.9 | 7.1 |
| [Press vulcanization product] | | | | | | | | |
| Hardness (JIS A) | 63 | 59 | 66 | 67 | 68 | 65 | 65 | 65 |
| 100% Modulus (MPa) | 5.4 | 4 | 7 | 7.1 | 7.4 | 6.8 | 6.5 | 6.8 |
| Strength at break (MPa) | 14.5 | 10.6 | 12.7 | 12.9 | 12.6 | 12.5 | 12.4 | 12.5 |
| Elongation at break (%) | 450 | 240 | 180 | 170 | 170 | 180 | 190 | 180 |
| Compression set (%) | 26 | 20 | 24 | 20 | 21 | 32 | 28 | 25 |

TABLE 1-continued

| Item | Example No. | | | | | | | |
|---|---|---|---|---|---|---|---|---|
| | 1 | 2 | 3 | 4 | 5 | 6 | 7 | 8 |
| [Heat aging resistance property of Press vulcanization product] | | | | | | | | |
| Hardness change (pts) | +6 | +3 | +4 | +3 | +3 | +5 | +5 | +4 |
| 100% modulus change (%) | +12 | −1 | +0 | −1 | −1 | +8 | +7 | −1 |
| Strength at break change (%) | −10 | +0 | −5 | −4 | −6 | −3 | +0 | −5 |
| Elongation at break change (%) | +6 | −6 | −10 | −6 | −5 | −12 | −11 | −6 |
| [Oven vulcanization (postcured) product] | | | | | | | | |
| Hardness (JIS A) | 65 | 60 | 67 | 68 | 68 | 66 | 66 | 66 |
| 100% modulus (MPa) | 5.9 | 4.3 | 7.3 | 7.4 | 7.5 | 7 | 7 | 7.1 |
| Strength at break (MPa) | 15.1 | 10.9 | 12.7 | 12.8 | 12.8 | 12.6 | 12.5 | 12.5 |
| Elongation at break (%) | 420 | 230 | 170 | 170 | 170 | 170 | 180 | 170 |
| Compression set (%) | 15 | 10 | 13 | 9 | 10 | 18 | 17 | 15 |
| [Heat aging resistance property of oven vulcanization (postcured) product] | | | | | | | | |
| Hardness change (pts) | +5 | +1 | +1 | +1 | +1 | +3 | +2 | +1 |
| 100% modulus change (%) | +6 | −4 | −1 | −4 | −5 | +0 | −2 | −3 |
| Strength at break change (%) | −10 | +0 | +1 | +0 | −5 | −5 | −3 | −1 |
| Elongation at break change (%) | +6 | −2 | −6 | +0 | −2 | −1 | +0 | −1 |

COMPARATIVE EXAMPLE 1

The following components were mixed, vulcanized and subjected to determination in the same manner as in Example 1:

| | |
|---|---|
| Acrylic elastomer C | 100 parts |
| Stearic acid | 1 part |
| 4,4'-bis(a,a-dimethylbenzyl)diphenylamine | 2 parts |
| FEF carbon black | 60 parts |
| Azelaic acid | 1 part |
| Calcium oxide | 1 part |
| Octadecyltrimethylammonium bromide | 1 part |

COMPARATIVE EXAMPLE 2

In Comparative Example 1, the same amount of calcium hydroxide was used in place of the calcium oxide.

COMPARATIVE EXAMPLE 3

In Comparative Example 1, the same amount of magnesium oxide was used in place of the calcium oxide.

COMPARATIVE EXMPLE 4

In Comparative Example 1, the same amount of magnesium hydroxide was used in place of the calcium oxide.

COMPARATIVE EXAMPLE 5

In Comparative Example 1, 4 parts of sodium stearate was used in place of one part of calcium oxide.

COMPARATIVE EXAMPLE 6

In Comparative Example 1, the same amount of disodium azelate was used in place of the azelaic acid and no calcium oxide was used.

Results of determination in the foregoing Comparative Examples 1 to 6 are shown in the following Table 2.

TABLE 2

| Item | Comp. Ex. No. | | | | | |
|---|---|---|---|---|---|---|
| | 1 | 2 | 3 | 4 | 5 | 6 |
| [Vulcanization Characteristics] | | | | | | |
| tc10 (min.) | 0.65 | 0.89 | 0.68 | 0.91 | 0.61 | 0.5 |
| tc90 (min.) | 8 | 7.91 | 8.26 | 8.1 | 2.75 | 3.38 |
| MH (Kg · cm) | 7.2 | 10.4 | 6.5 | 8.7 | 3.3 | 6.4 |
| [Mooney viscosity] | | | | | | |
| Mooney viscosity $ML_{MIN}$ | 48 | 46 | 48 | 45 | 35 | 30 |
| [Scorch time] | | | | | | |
| $t_5$ (min.) | 5.4 | 5.2 | 4.7 | 4.4 | 5.2 | 5.6 |
| [Press vulcanization product] | | | | | | |
| Hardness (JIS A) | 70 | 73 | 68 | 71 | 48 | 63 |
| 100% Modulus (MPa) | 6.3 | 6.8 | 4.7 | 5.1 | 1.1 | 3.5 |
| Strength at break (MPa) | 11.6 | 11.7 | 11.8 | 11.9 | 4.2 | 10.9 |
| Elongation at break (%) | 210 | 160 | 240 | 180 | 460 | 230 |
| Compression set (%) | 80 | 73 | 85 | 79 | 72 | 44 |
| [Heat aging resistance property of press vulcanization product] | | | | | | |
| Hardness change (pts) | +9 | +5 | +10 | +6 | +6 | +6 |
| 100% modulus change (%) | +79 | +33 | +87 | +40 | +8 | +12 |
| Strength at break change (%) | +5 | −9 | +3 | −2 | −5 | +1 |
| Elongation at break change (%) | −38 | −25 | −42 | −28 | −10 | −16 |
| [Oven vulcanization (postcured) product] | | | | | | |
| Hardness (JIS A) | 74 | 75 | 73 | 74 | 49 | 67 |
| 100% modulus (MPa) | 8 | 8.8 | 7 | 7.9 | 1.3 | 4.2 |
| Strength at break (MPa) | 12.6 | 13 | 11.9 | 12.5 | 4.6 | 11.1 |
| Elongation at break (%) | 150 | 140 | 150 | 150 | 430 | 200 |
| Compression set (%) | 43 | 44 | 42 | 43 | 68 | 32 |
| [Heat aging resistance property of oven vulcanization (postcured) product] | | | | | | |
| Hardness change (pts) | +4 | +3 | +4 | +4 | +4 | +3 |
| 100% modulus change (%) | −1 | −8 | +3 | +1 | +4 | −3 |
| Strength at break change (%) | −8 | −11 | −6 | −8 | −5 | −2 |
| Elongation at break change (%) | −3 | −7 | +0 | −4 | −2 | −6 |

What is claimed is:

1. A vulcanization molding product obtained by vulcanization molding of an acrylic elastomer composition comprising (A) a halogen-containing acrylic elastomer, (B) a polyvalent carboxylic acid, (C) a quaternary onium salt and (D) a hydrotalcite without any secondary vulcanization.

2. A vulcanization molding product according to claim 1, wherein the acrylic elastomer further contains a higher fatty acid polyhydric alcohol ester or a higher aliphatic amine as a lubricant.

3. A vulcanization molding product according to claim 1, wherein the acrylic elastomer composition further contains ureas as a vulcanization retardant.

4. A vulcanization molding product according to claim 1, wherein the hydrotalcite is represented by the general formula: $Mg_{4.5}Al_2(OH)_{13}CO_3 \cdot 3.5H_2O$.

5. A vulcanization molding product according to claim 1, wherein the hydrotalcite functions as an inorganic anion exchanger.

6. A vulcanization molding product according to claim 1, product has a compression set characteristic measured at 150° C. for 70 hours which is about 30% or less.

* * * * *